Oct. 27, 1970    H. G. CHICKERING, JR    3,536,284
MOUNTING FOR A DISTANCE-MEASURING DEVICE
Filed Jan. 29, 1968    2 Sheets-Sheet 2
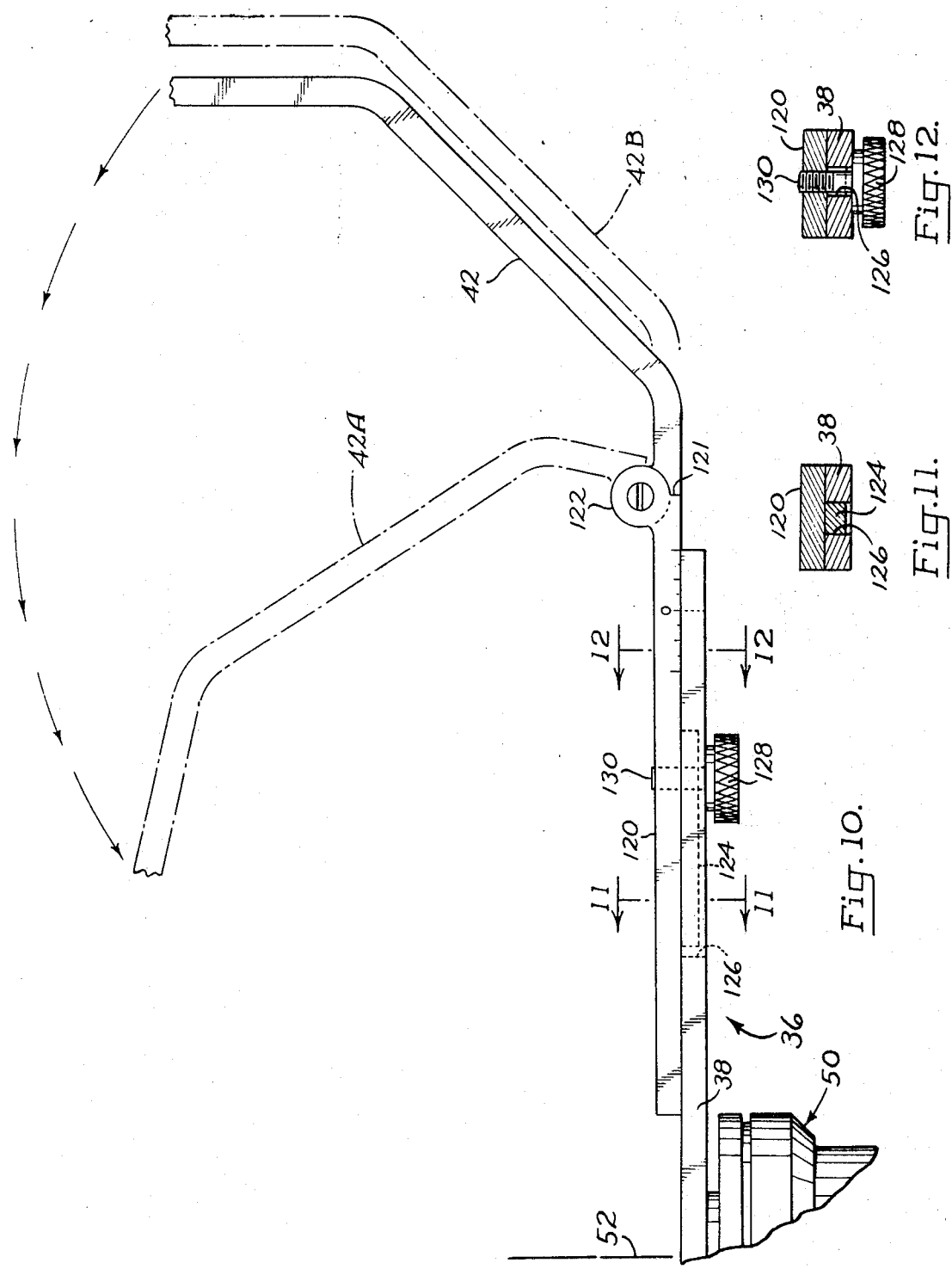
Herbert G. Chickering, Jr.
INVENTOR
BY
Kolisch & Hartwell
Attys.

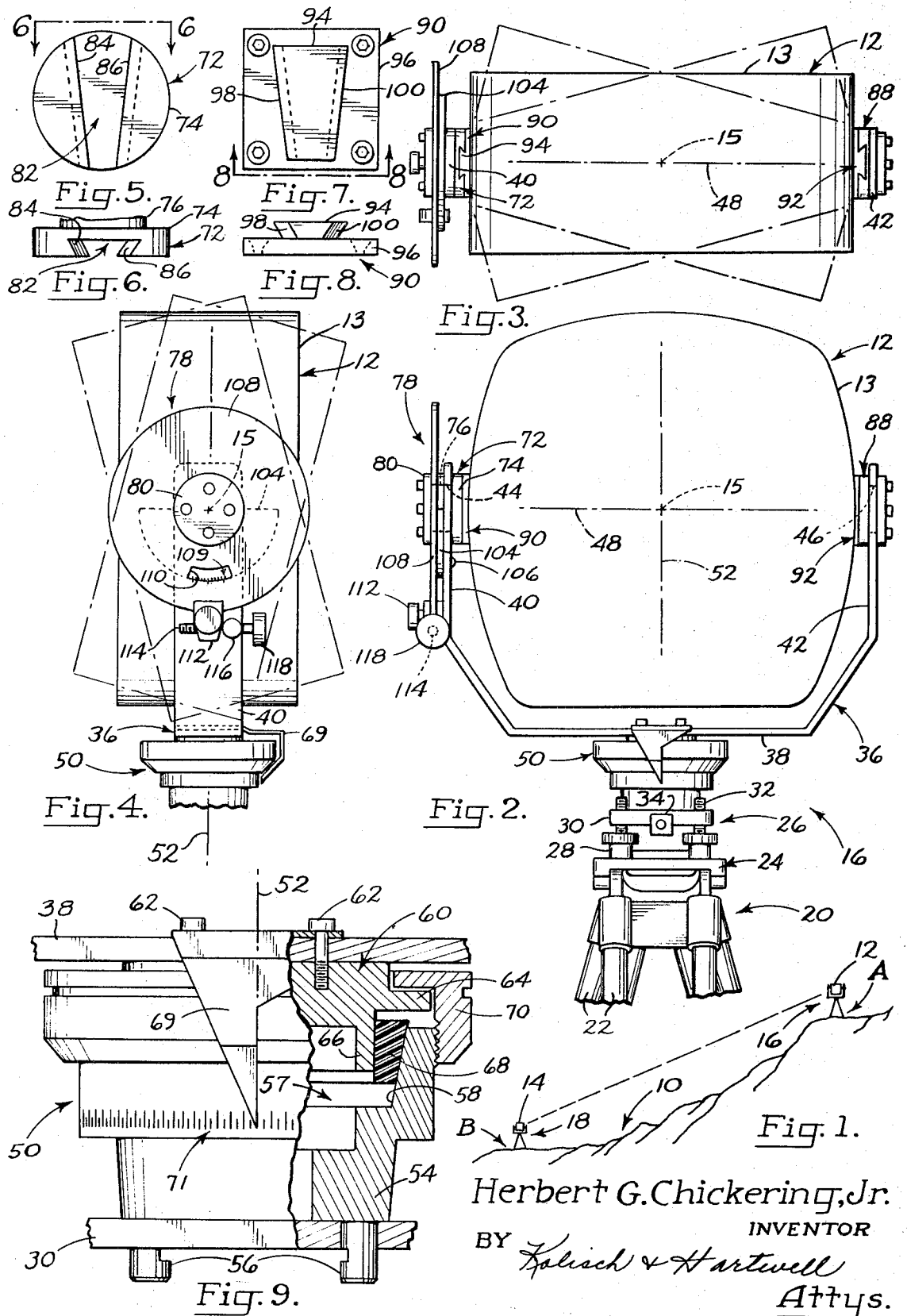

United States Patent Office 3,536,284
Patented Oct. 27, 1970

3,536,284
MOUNTING FOR A DISTANCE-MEASURING DEVICE
Herbert G. Chickering, Jr., 1190 7th Ave. W., Eugene, Oreg. 97402
Filed Jan. 29, 1968, Ser. No. 701,150
Int. Cl. F16n 11/12
U.S. Cl. 248—183
5 Claims

ABSTRACT OF THE DISCLOSURE

A mounting for a radio-frequency distance-measuring device which measures distances from an electrical reference center in the device. The mounting includes a, stand, and a bracket with spaced apart upstanding posts detachably supporting the device by means of interfitting cradle and catch portions. Pivoting of the device is permitted about substantially horizontal and vertical axes, respectively, which extend through the electrical reference center.

---

This invention relates to distance-measuring equipment, and more particularly to a mounting for a radio-frequency distance-measuring device which measures distances from an electrical reference center in the device. For purposes of illustration, a preferred embodiment of the mounting is described herein in connection with a conventional device, of the type mentioned, called a tellurometer made by Tellurometer, Inc.

In surveying and like operations it is frequently desirable to make an accurate measurement of the straight line distance between a pair of points spaced over the ground. For such measurements, persons in the past have employed pairs of devices, such as tellurometers, which accurately indicate the distance between what is known as their electrical reference centers. In practice, the devices in a pair are placed with their electrical reference centers over the two points of interest on the ground, respectively, and aimed directly at one another. Radio-frequency energy is transmitted between the devices, and interpreted in one of the devices to indicate the distance between the reference centers.

However, a problem heretofore has been the difficulty of properly positioning such devices on the ground, with the devices aimed directly at one another. This difficulty has arisen principally from the practice in the past of anchoring each device on top of a tripod, and then adjusting the legs of the latter to aim the device in the correct direction. But changing leg length shifts the position of the reference center in the device laterally with respect to the ground, introducing another adjustment which itself might require a still further adjustment in leg length. Such a practice is time-consuming, and often results in inaccurate placement of a device's reference center, which must be precisely positioned directly over the point on the ground from which the distance is measured.

Therefore, a general object of the present invention is to provide a novel mounting for a radio-frequency distance-measuring device, which greatly facilitates positioning of the device's electrical reference center properly relative to a point on the ground from which a distance is to be measured.

More particularly, an object of the invention is to provide such a mounting which includes a stand, and mechanism for mounting a distance-measuring device in an elevated position on the stand accommodating pivoting of the device about substantially horizontal and vertical axes which extend through the electrial reference center in the device.

To accomplish this, the invention features a novel bracket pivoted on the stand for turning about the upright axis mentioned, and carrying pivot means which support the device, and accommodate pivoting of the device about the horizontal axis mentioned.

With such a mounting, the device can easily be positioned with its reference center directly over a particular point on the ground, and the device tilted and turned to aim it properly at its companion device, without disturbing position of such reference center.

A further object of the invention is to provide a mounting of the type described which includes means for locking the device in place once it has been properly positioned.

Yet another object of the invention is to provide such a mounting which further includes novel cradling means accommodating detachable mounting of a device on a bracket. As contemplated herein, the cradling means includes novel recesses and catches which releasably lock together due to the action of gravity on a device, and which permit rapid seating of the device in a position with its electrical reference center lying on the point of intersection of the above-mentioned horizontal and vertical axes.

These and other objects and advantages attained by the invention will become more fully apparent as the description which follows is read in conjunction with the accompanying drawings, wherein:

FIG. 1 is a simplified perspective view illustrating a pair of radio-frequency distance-measuring devices mounted according to the invention at points spaced over an expanse of terrain;

FIG. 2 is an enlarged rear elevation illustrating mounting apparatus constructed according to the invention provided for one of the devices in FIG. 1;

FIG. 3 is a view taken from the top of FIG. 2 further illustrating the mounting, and showing the distance-measuring device adjusted to several positions about an upright axis;

FIG. 4 is a side elevation taken from the left side of FIG. 2 illustrating the distance-measuring device adjusted to several positions about a horizontal axis;

FIG. 5 is an enlarged front elevation illustrating a recess forming part of a cradling means in the mounting of FIGS. 2–4;

FIG. 6 is a view taken along the line 6—6 in FIG. 5;

FIG. 7 is a front elevation, on the same scale as FIGS. 5 and 6, illustrating a catch adapted to be received within the recess shown in FIGS. 5 and 6;

FIG. 8 is a view taken along the line 8—8 in FIG. 7;

FIG. 9 is an enlarged view illustrating pivot means employed in the mounting to join a bracket therein to a stand;

FIG. 10 is a fragmentary view illustrating a modified construction of a bracket in the mounting proposed herein; and FIGS. 11 and 12 are cross-sectional views taken along lines 11—11, 12—12, respectively, in FIG. 10.

Turning now to the drawings, and referring first to FIG. 1, indicated generally at 10 is an expanse of terrain. Supported above spaced points indicated at A, B on the terrain are a pair of conventional radio-frequency distance-measuring devices, such as tellurometers, 12, 14 aimed at one another. Devices 12, 14 are similar, and considering device 12 which is shown further in FIGS. 2–4, it comprises a housing 13 inside of which is located electrical circuitry (not shown) including what is called an electrical reference center or point 15. Device 12 measures distances from center 15, with radio-frequency energy communicating with such center along a line (normal to the plane of FIG. 2) extending forwardly away from the device.

Devices 12, 14 transmit radio-frequency energy between them in a well-known fashion, and indicate the straight line distance existing between their electrical reference centers. Devices 12, 14 are supported above the ground by means of mountings 16, 18, respectively, constructed according to the present invention.

Mountings 16, 18 are similar, and referring to FIGS. 2–4 which show mounting 16, each comprises a stand 20 (FIG. 2) which may take the form of a conventional surveying tripod stand having legs, such as legs 22, supporting a platform 24.

Suitably releasably anchored to the top of platform 24 is a conventional tri-back assembly 26 (FIG. 2). Assembly 26 includes a base 28, and a platform 30 supported above the base for movement toward and away therefrom on three adjustable screw mechanisms, such as screw mechanism 32. The screw mechanisms may be adjusted to level platform 30. Also included in the tri-back assembly is the usual optical means, part of which is shown at 34, for centering the assembly vertically over a point of interest, such as point A (FIG. 1), on the ground. To accomplish such vertical positioning, the tri-back assembly is released for movement on platform 24, adjusted until the optical centering means indicates that the assembly is centered directly over the particular point on the ground, and then locked in place on platform 24.

Also forming part of mounting 16 according to the invention is a bracket 36 including an elongated, substantially horizontal base 38, and a pair of laterally spaced upright posts 40, 42 extending upwardly from opposite ends of the base. While the parts in the bracket shown in FIGS. 2–4 are integral, it will be explained later how relatively movable, adjustable parts may be provided to facilitate storage and carrying of the bracket, and to permit a given mounting to accommodate distance-measuring devices of different sizes. Provided adjacent the upper ends of posts 40, 42 are a pair of bores 44, 46, respectively (shown in dashed outline in FIG. 2). Bores 44, 46 are substantially the same in diameter, and are aligned along a substantially horizontal axis indicated at 48 in FIG. 2.

Bracket 36 is mounted on top of platform 30 in the tri-back assembly through a pivot connection, or first pivot means 50, which accommodates turning of the bracket about a substantially vertical axis indicated at 52 in FIG. 2. Axis 52 intersects, and is disposed at a right angle to, axis 48.

Considering the construction of pivot connection 50, and referring for a moment to FIG. 9, it includes a base 54. Base 54 is anchored to platform 30 through legs, such as legs 56, which are joined to and project downwardly from the base into suitable accommodating bores provided in the platform. Base 54 includes an upwardly facing recess 57 bounded adjacent its upper extremity by a truncated conical face 58 sloping in the manner shown in FIG. 9. The pivot connection further comprises a spool 60 which is joined to the underface of bracket base 38 by screws 62. The spool includes a horizontally disposed, radially outwardly projecting annular flange 64, and a cylindrical part 66 extending axially downwardly from flange 64. Spool 60 is supported on base 54 through an annular ring 68 having the cross-sectional configuration shown. Ring 68 seats between the outside surface of part 66 and conical face 58. In the embodiment shown herein, ring 68 may be formed of nylon..

Indicated at 70 is an attaching ring rotatably mounted on spool 60 and screwed onto the outside of base 54. Ring 70 constitutes a first releasably locking means herein which may be adjusted to permit or prevent rotation of spool 60 (and hence bracket 36) about axis 52 relative to base 54. Spool 60 and base 54 are locked against relative rotation with ring 70 adjusted to urge the spool downwardly toward the base. On such adjustment of ring 70, ring 68 produces frictional locking between the spool and base. With ring 70 loosened, spool 60 is free to rotate about axis 52.

Screws 62 also function to secure a pointer 69 to bracket base 38. Pointer 69, viewed with reference to angle markings 71 on the outside of base 54, facilitates positioning of bracket 36 about axis 52.

Considering now the means provided for supporting device 12 on bracket 36, and referring again to FIGS. 2–4, rotatably mounted on post 40 for turning about axis 48 is a pin 72. The pin includes a cylindrical head 74 disposed against the inside face of post 40, and a shaft 76 formed integrally with head 74. Shaft 76 extends through, and is rotatably received within, bore 44 in the post. Shaft 76 also extends through what is called a vertical circle assembly 78 (which will be more fully described later) with the outer end of the shaft secured to a cylindrical plate 80. Plate 80 prevents retraction of pin 72 from assembly 78 and bore 44.

Further describing pin 72, and referring for a moment to FIGS. 5 and 6, formed in head 74 is an elongated slot, or recess, 82. Opposite sides of slot 82 are bounded by a pair of planar faces 84, 86 which converge progressing downwardly along the slot in FIG. 5, and diverge progressing axially through the pin toward shaft 76 in FIG. 6.

A pin 88, which is similar in construction to pin 72, is rotatably mounted within bore 46 in post 42 for rotation about axis 48. The shafts in pins 72, 88, together with bores 44, 46, respectively, constitute second pivot connections, or second pivot means, herein.

Device 12 is detachably mounted on pins 72, 88 through assemblies 90, 92, respectively which, are suitably secured to opposite sides of housing 13 in the device. The two assemblies are substantially the same in construction, and considering assembly 90 which is illustrated in FIGS. 7 and 8, it includes a catch projection 94, formed integrally with and projecting from one face of a mounting plate 96. Bounding the left and right sides of catch 94 in FIGS. 7 and 8 are planar faces 98, 100, respectively. Faces 98, 100 have substantially the same angular relationship relative to one another as do previously mentioned faces 84, 86 in slot 82. The catch thus comprises a wedge-shaped piece with a dovetail cross section (see FIGS. 3 and 7).

Distance-measuring device 12 is held in place on pins 72, 88 due to the action of gravity on the device, with catch 94, and the corresponding catch in assembly 92, firmly yet removably seated, respectively, in recess 82 and the corresponding recess provided in the head of pin 88. The pairs of faces bounding the sides of the catches and the recesses engage and seat firmly against one another, and lock device 12 for rotation substantially as a unit with pins 72, 88.

Through proper positioning of fasteners 90, 92 on the opposite sides of housing 13, the catches are located so as to seat the device on pins 72, 88 with the device's electrical reference center or point 15 positioned exactly at the point of intersection of axes 48, 52. With the reference center so positioned, the device can be adjusted about axes 48, 52 without the reference center moving.

Thus, it will be seen that each of the posts 40, 42 has at its upper extremity seating means for seating a projection on the side of the measuring device, in the form of pins 72, 88 provided with slots or recesses such as shown at 82. Each slot constitutes a cradle member or portion with an open upwardly facing mouth which embraces opposite sides of a projection or catch when seating it, and a catch is displaced from a cradle member by upward lateral displacement of the catch.

Completing a description of the apparatus shown, vertical circle assembly 78 comprises an upright half-circular plate 104 secured to post 40 by means of fasteners, such as fastener 106. The assembly also includes an upright rotatable, full-circular plate 108 positioned laterally outwardly of plate 104, and suitably mounted on shaft 76 for rotation therewith. A portion of the outer face of plate 104, which may have suitable angle markings, such as those shown at 109 (FIG. 4), provided on it, is exposed through a window 110 (FIG. 4) provided in plate 108.

Indicated at 112 is a clamping mechanism, or second releasable locking means, which may be adjusted to clamp against and release plate 108. The clamping mechanism is mounted for travel on a threaded shaft 114 which is journaled in a mounting 116. Shaft 114 is turned about its longitudinal axis by a knob 118 joined to the right end of the shaft in FIG. 4. Mounting 116 is suitably swiveled to the outside of post 40 for turning about an axis substantially paralleling axis 48. With clamping mechanism 112 adjusted to release plate 108, device 12 can rotate freely about axis 48. With the clamping mechanism tightened against plate 108, such free rotation is prevented. However, in the latter situation, a certain amount of rotation of the distance-measuring device is still possible through turning of shaft 114 to move the clamping mechanism and plate 108. Shaft 114 herein constitutes infinitely adjustable means.

Explaining now how the apparatus shown performs when set up to measure a distance, as in FIG. 1, bracket 36 and pivot connection 50 are placed on stand 20, and are adjusted to position axis 52 whereby it extends through a point on the ground, such as point A. Device 12 is seated on pins 72, 88 with the catches in assemblies 90, 92 seating firmly in the recesses in the heads of the pins. With the assemblies properly positioned on housing 13, as mentioned earlier, such seating of the device results in reference center 15 occupying a position at the point of intersection of pivot axes 48, 52. Gravity holds the device in place on the pins.

With ring 70 and clamping mechanism 112 released, device 12 is turned about axes 48, 52 to aim it directly at its companion device 14 (FIG. 1). Such turning does not in any way disturb the position of reference center 15 since the latter is located where axes 48, 52 intersect. For example, FIGS. 3 and 4 illustrate in dash-dot outline different angular positions which the device may assume about axes 52, 48, respectively, with center 15 remaining in place. The ring and clamping mechanisms are then adjusted to lock the device in place. Fine adjustment of the device's angular position about axis 48 is produced through turning of shaft 114.

Similar adjustments are made to position the electrical reference center of device 14 over point B, and to aim the device at device 12. Devices 12, 14 are then operated in a conventional manner to indicate the distance between their electrical reference centers.

Thus, the invention provides a mounting which facilitates accurate and relatively quick placement of a radio-frequency distance-measuring device with the device's electrical reference center directly over a point on the ground from which a distance is to be measured. With pivoting of the device permitted about substantially horizontal and vertical axes extending through the reference center, aiming of the device is possible without disturbing the position of the reference center. Thus, the time required to set up and position such a device is held to a minimum.

The novel receiving recesses in pins 72, 88 which releasably receive and cradle the catches in assemblies 90, 92, permit rapid seating of a measuring device properly in place on bracket 36, with the device then supported due to the action of gravity thereon.

Considering now FIGS. 10–12, bracket 36 here is modified somewhat to accommodate collapse of the posts to facilitate storage, and further to permit adjustment of the lateral spacing of the posts to receive measuring devices of different sizes.

More specifically, post 42 is joined to a plate 120 through a hinge 122 which permits swinging of the post relative to the plate about an axis normal to the plane of FIG. 10. A shoulder 121 formed on plate 120 below hinge 122 in FIG. 10 engages a confronting shoulder formed on post 42 (with the latter in the position where it is shown in solid outline), to limit swinging of the post to the right in FIG. 10.

Plate 120, in turn, is mounted on base 38 through a lockable slide assembly including an elongated bar 124 secured to the base of the plate slidably received in an elongated slot 126 provided in the base. Slot 126 accommodates sliding of bar 124, and hence of plate 120 and post 42, longitudinally relative to base 38. A locking screw 128 having a threaded shaft 130 extending upwardly through slot 126 and into suitable bores in bar 124 and plate 120, can be adjusted to permit or prevent sliding of the bar, plate and post. Post 40 (not shown in FIGS. 10–12) is mounted on base 38 in a similar fashion.

With such construction, the posts in the brackets may readily be folded over the base, to positions such as that shown in dash-dot outline at 42A for post 42, to facilitate storage and carrying. Also, the relative lateral spacing of the posts on the base may be adjusted to accommodate distance-measuring devices of different sizes. For example, post 42 may be shifted outwardly to a position such as that shown at 42B in dash-dot outline. To facilitate centering of the posts properly relative to axis 52, appropriate markings may be provided on plate 120, and on the corresponding plate for post 40, to indicate the positions of such plates on base 38.

While an embodiment of the invention has been described herein, and a modification shown, other variations and changes are, of course, possible without departing from the spirit of the invention, and it is desired to cover all such variations and changes which would be apparent to one skilled in the art, and that come within the scope of the appended claims.

It is claimed and desired to secure by Letters Patent:

1. In combination with a radio-frequency distance-measuring device, a stand, and mechanism supporting said device in an elevated position on said stand including first pivot means accommodating pivoting of the device about a substantially vertical axis and second pivot means accommodating pivoting of the device about a substantially horizontal axis which intersects said vertical axis, said mechanism comprising a base which extends beneath the device and a pair of spaced upright posts secured to and projecting up from said base along opposite sides of the device, said second pivot means comprising a pivot connection between said device and each of said posts, said pivot connection comprising a cradle member with an open upwardly facing mouth and a catch member displaceable from the cradle member by lateral upward displacement through said mouth, said catch member being nonrotatably receivable within the cradle member, one of said members being mounted on said post and the other member being mounted on said device and the mounting for at least one of said members accommodating relative rotation of the member about said horizontal axis.

2. The combination of claim 1, wherein said catch member is a wedge-shaped piece with a dovetail cross section.

3. The combination of claim 1, which further comprises releasable locking means for releasably locking the device in different adjusted positions about said horizontal axis, said releasable locking means including adjustable means engageable with the member which is mounted for relative rotation to inhibit such relative rotation.

4. A mounting for a radio-frequency distance measuring device which has projections on either side thereof, the mounting comprising
a stand, and
a bracket supported on the stand which is pivotable about a substantially vertical axis,
said bracket including a base which is adapted to extend beneath the device and a pair of spaced-apart upright posts secured to and projecting up from said base adapted to lie on opposite sides of said device, each of said posts at the upper extremity thereof having seating means for seating a projection on the side of said device, with the device on such projections being so seated being accommodated pivotal movement about a horizontal axis, the seating means for at least one post including a cradle portion with an upwardly facing open mouth which embraces opposite sides of a projection when seating it and that permits removal of a projection by upward lateral displacement of the projection, each post being mounted on said base through a hinge which accommodates swinging of the post towards the other post, said post and said base including cooperating shoulders which come into engagement with the post upright to define an upright position for the post.

5. The mounting of claim 4 wherein a slide assembly is provided for each post slidably supporting the post on the base to enable changing the relative lateral spacing of the posts with the posts upright, and wherein the hinge means for a post moves with the post on changing the post's position using its slide assembly.

References Cited

UNITED STATES PATENTS

| | | | |
|---|---|---|---|
| 208,732 | 10/1878 | Gurley | 248—178 |
| 1,003,419 | 9/1911 | Berger | 33—46 |
| 1,108,034 | 8/1914 | Wainwright | 33—72 |
| 1,134,610 | 4/1915 | Hartmann | 33—46 |
| 1,209,107 | 12/1916 | Berger | 33—46 |
| 1,221,677 | 4/1917 | Catheart | 248—183 |
| 1,252,207 | 1/1918 | Walker | 248—224 |
| 2,666,610 | 1/1954 | Nerman | 248—183 |
| 2,766,530 | 10/1956 | Tishler | 33—46 |
| 2,926,879 | 3/1960 | Dietrich | 248—224 X |
| 3,131,251 | 4/1964 | Ryan | 248—224 X |
| 3,315,257 | 4/1967 | Sauberlich | 343—12 |

FRANCIS K. ZUGEL, Primary Examiner

U.S. Cl. X.R.

248—224